United States Patent [19]

Patel et al.

[11] 4,036,822

[45] July 19, 1977

[54] BEARING MATERIAL

[75] Inventors: Padma Ambalal Patel, Wembley; Dennis Stanley Baker, High Wycombe, both of England

[73] Assignee: The Glacier Metal Company Limited, Alperton, England

[21] Appl. No.: 618,157

[22] Filed: Sept. 30, 1975

[30] Foreign Application Priority Data

Oct. 2, 1974 United Kingdom ............... 42750/74

[51] Int. Cl.$^2$ ............................................. C08F 28/00
[52] U.S. Cl. ..................................... 260/79; 260/79.1; 427/385 R; 428/419
[58] Field of Search ................................. 260/79, 79.1

[56] References Cited

U.S. PATENT DOCUMENTS

| | | | |
|---|---|---|---|
| 3,622,376 | 11/1971 | Tieszen | 260/79 |
| 3,652,327 | 3/1972 | Hill, Jr. et al. | 260/79 |
| 3,725,362 | 4/1973 | Walker | 260/79 |
| 3,776,880 | 12/1973 | Blackwell | 260/37 R |

*Primary Examiner*—Melvyn I. Marquis
*Attorney, Agent, or Firm*—Pierce, Scheffler & Parker

[57] ABSTRACT

This invention is a method of curing polyphenylene sulphide polymer to produce a plain bearing lining material in which an oxide of manganese or cadmium, is included with the polymer powder to accelerate the curing process by catalytic action and by the release of oxygen within the body of the material.

8 Claims, No Drawings

BEARING MATERIAL

This invention relates to bearing materials in which the bearing lining is defined by an arylene sulphide polymer. Such a polymer used as a bearing lining material as described in British Patent Specification No. 36669/74 and the preferred example of such a polymer is polyphenylene sulphide.

The arylene sulphide is bought in powder form as a linear polymer of low molecular weight and then it is spread on a bearing backing material and heated to a sufficient temperature for a sufficient time to extend the molecular chains and to cause cross linking between chains. As that curing process proceeds, first the polymer remains in a more or less crystalline state and then it becomes ductile but after further curing it once again becomes brittle and then it is unsuitable for use as a bearing material. The desired condition is when the material is ductile and it appears that it is probably satisfactory provided the hardness is not greater than 20 Vickers Pyramid hardness.

In the past the curing process to reach the right state of ductility for use as a bearing material has taken about 2 hours and that makes the process uneconomic and also requires long ovens through which the material can be passed during the curing process.

It is an object of the present invention to accelerate the curing process.

According to the present invention a bearing lining is made by curing an arylene sulphide polymer in the presence of a transition metal oxide.

Preferred transition metals are maganese and cadmium, and it has been discovered that by including certain proportions of their oxides with the arylene sulphide polymer powder the time for curing the arylene sulphide can be substantially reduced, possibly by a factor of 8 to 1.

It appears that the metal oxides have in the first place a catalytic action helping to accelerate the curing process and in the second place art to liberate oxygen which assists in achieving effective cross linking throughout the mass of the bearing lining material and in particular in the centre where it is most removed from oxygen in the ambient air.

Preferred metal oxides are manganese dioxide and cadmium oxide, and they may be present for example in amounts between 0.5 and 5% by weight of the total weight of the lining material.

Where, as is preferred, the polymer is polyphenylene sulphide, the preferred curing temperature is 370° C and it has been found that by including 5% of the metal the curing time to reach the appropriate state of ductility can be reduced from 2 hours to 15 minutes.

By heating to a lower temperature, for example 300° C the same ductility can be achieved after a longer time for example 2 hours.

The particular transition metal oxide and the proportion of it selected for a particular case will depend upon the application, but in general the method is suitable both for providing a bearing lining on a preformed surface for example a valve seat or a cam surface, and also for application to a thin strip or other flat backing which is subsequently formed into a different shape, for example into a semi-cylindrical shell for use as a journal bearing. If the correct ductility of the cured polyphenylene sulphide material is achieved, then the flat material can be formed into a shell with a radius of perhaps between 1 and 2 inches without cracking or crumpling the lining material and without destroying its bond to the backing, which is conveniently of aluminium.

The invention includes a bearing having a lining made by the method described, and also a strip of bearing lining on a backing for subsequent formation into a bearing.

It has been proposed in the past to use thin coatings of polyphenylene sulphide on such domestic articles as frying pans, but the coatings have only been about 0.001 inches thick and with such coatings the problems of obtaining uniform cross-linking do not arise. The bearings with which this invention is concerned tend to have linings of the arylene sulphide at least 0.010 or 0.015 or 0.020 inches thick or even thicker.

The invention may be carried into practice in various ways and certain example will now be described by way of example.

EXAMPLE 1

5% by weight of ferric oxide $Fe_2O_3$ with a maximum particle size of 53 microns was thoroughly mixed with polyphenylene sulphide powder of low molecular weight and spread in a layer 0.060 inches thick on an elongate aluminium strip backing. The strip was then passed through an oven and heated for 15 minutes at 370° C. The polyphenylene sulphide was cured to become sufficiently ductile for subsequent formation by bending through 180° with a radius of bend of about 2 inches. The thickness of the cured coating was about 0.020 inches.

EXAMPLE 2

The process of EXAMPLE 1 was followed but manganese dioxide $MnO_2$ was used instead of ferric oxide and was present in an amount of 3% by weight.

EXAMPLE 3

In this example, 1% of cadmium oxide CdO was used instead of the metal oxides in the previous examples and curing was performed for 17 minutes.

Some of the examples listed above were repeated using a curing temperature of only 300° C and it was found that curing for up to about 2 hours was necessary to produce the same degree of ductility in the bearing lining. There are some applications where it does not matter that the curing process takes longer because of the advantage that the curing temperature is not so high.

It appears that in general the amount by weight of the transition metal oxide could be varied—possibly within the range 0.5 to 5% by weight of the oxide and polyphenylene sulphide powder, and that the curing temperature and duraction could also be varied somewhat, while still giving a cured bearing lining which was sufficiently ductile for many bearing applications.

What is claimed is:

1. A method of making a bearing lining by curing an arylene sulphide polymer by heating the same in the presence of an oxide of a metal selected from the group consisting of cadmium and manganese, in a proportion between 0.05% and 5.0% by weight of the lining, in which method the heating accelerates the curing and acts of liberate oxygen which assists in achieving cross linking.

2. A method as claimed in claim 1, in which the lining has a thickness of from 0.01 inch to 0.02 inch.

3. A method as claimed in claim 1 in which the polymer is polyphenylene sulphide.

4. A method as claimed in claim 3 in which the oxide is manganese dioxide.

5. A method as claimed in claim 4 in which the manganese dioxide is in a proportion of 3% by weight of the lining.

6. A method as claimed in claim 3 in which the oxide is cadmium oxide.

7. A method as claimed in claim 6 in which the cadmium oxide is present in a proportion of 1% by weight of the lining.

8. A method as claimed in claim 3 in which the curing temperature is about 370° C.

* * * * *